United States Patent [19]

Koz et al.

[11] Patent Number: 5,644,355
[45] Date of Patent: Jul. 1, 1997

[54] ADAPTIVE VIDEO SUBSCRIBER SYSTEM AND METHODS FOR ITS USE

[75] Inventors: Mark Christopher Koz, Santa Clara; Masato Hata, Sunnyvale, both of Calif.

[73] Assignee: Intelligent Instruments Corporation, Santa Clara, Calif.

[21] Appl. No.: 140,172

[22] PCT Filed: Feb. 24, 1992

[86] PCT No.: PCT/US92/01446

§ 371 Date: Jul. 19, 1994

§ 102(e) Date: Jul. 19, 1994

[87] PCT Pub. No.: WO93/17526

PCT Pub. Date: Sep. 2, 1993

[51] Int. Cl.[6] .................................................. H04N 7/14
[52] U.S. Cl. ................................... 348/17; 379/93.17
[58] Field of Search ........................ 348/13, 7, 8, 12, 348/6, 14, 15, 16, 17, 18; 455/3.1, 4.1, 4.2, 5.1, 6.1, 6.3

[56] References Cited

U.S. PATENT DOCUMENTS

| | | | |
|---|---|---|---|
| 4,506,387 | 3/1985 | Walter | 455/612 |
| 4,829,372 | 5/1989 | McCalley et al. | 358/86 |
| 4,890,320 | 12/1989 | Monslow et al. | 380/10 |
| 4,949,187 | 8/1990 | Cohen | 358/335 |
| 4,951,147 | 8/1990 | Aknar et al. | 358/209 |
| 4,955,048 | 9/1990 | Iwamura et al. | 379/53 |
| 4,962,473 | 10/1990 | Crain | 364/900 |
| 4,975,771 | 12/1990 | Kassatly | 358/146 |
| 5,027,400 | 6/1991 | Baji et al. | 380/20 |
| 5,056,136 | 10/1991 | Smith | 380/10 |
| 5,062,136 | 10/1991 | Gattis et al. | 380/18 |
| 5,093,718 | 3/1992 | Hoarty et al. | 358/84 |
| 5,130,792 | 7/1992 | Tindell et al. | 358/85 |
| 5,132,992 | 7/1992 | Yurt et al. | 375/122 |

FOREIGN PATENT DOCUMENTS

| | | | |
|---|---|---|---|
| 0396062 | 4/1990 | European Pat. Off. | 90/45 |
| 2041707 | 10/1980 | United Kingdom | G06F 3/153 |
| 9106160 | 5/1991 | WIPO | H04H 1/02 |

OTHER PUBLICATIONS

"A Store–and–Forward Archictecture for Video–on–Demand Service"; A.D. Gelman, H. Kobrinski, L.S. Smoot, S.B. Weinstein; c. 1991; pp. 27.3.1–27.3.5; from the International Conference on Communications 1991.

*Primary Examiner*—Stella Woo
*Attorney, Agent, or Firm*—Donald E. Schreiber

[57] ABSTRACT

The technical field of the invention generally concerns systems for receiving and transmitting compressed video and audio data. In particular, a subscriber system (10) includes a communication subsystem (12) to receive compressed data from and transmit compressed data to a ISDN primary access line (14) utilizing the "bandwidth on demand" feature of that communication channel. The communication subsystem (12) separates received compressed data into compressed video data and compressed audio data. Within the subscriber system (10), the compressed video data is transmitted to a programmable video data format conversion subsystem (28) for decompression and production of a visible image on a CRT (82). Similarly, compressed audio data is transmitted to a programmable audio data format conversion subsystem (192) for decompression and production of an audible sound on a speaker (262). Compressed data of visible images and audible sounds may also be obtained with and transmitted from the subscriber system (10).

28 Claims, 3 Drawing Sheets

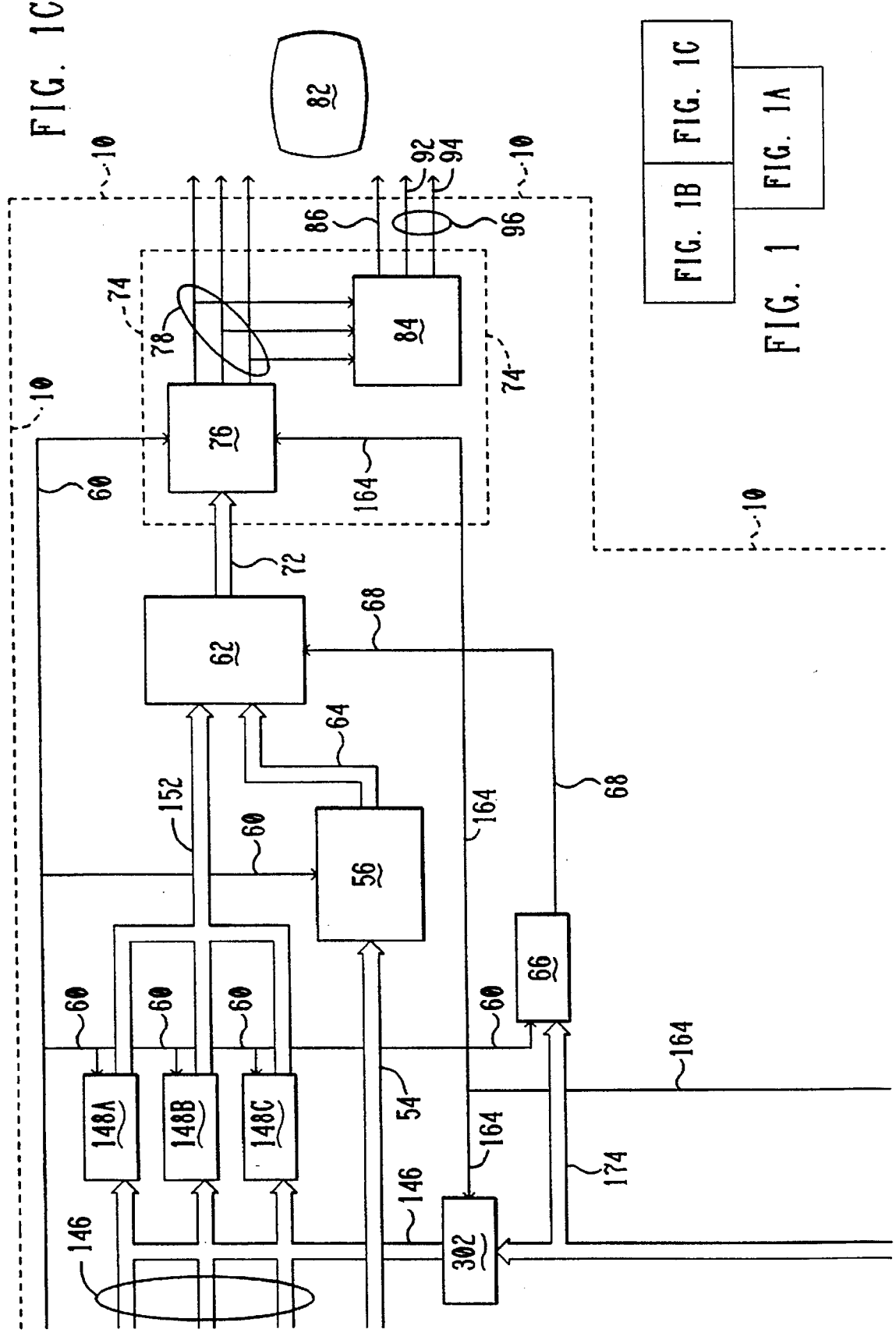

ADAPTIVE VIDEO SUBSCRIBER SYSTEM AND METHODS FOR ITS USE

TECHNICAL FIELD

The present invention relates generally to the technical field of electronic storage and transmission of video data and, more particularly, to a subscriber system for receiving and/or transmitting video data in a compressed digital format over a comparatively narrow bandwidth communication channel such as that provided by an Integrated Services Digital Network ("ISDN") twisted pair communication channel, and for presenting images and/or sounds represented by received, compressed video data.

BACKGROUND ART

To deal rationally with the complexity of present communication systems and with the need to make different systems mutually compatible, the International Standards Organization ("ISO") developed a model for specifying such systems. Using this model, called the Open Systems Interconnect ("OSI") model, a communication system can be broken down into a hierarchial structure that permits standards to be defined at each level in the structure. The OSI model provides a hierarchy of seven different layers that can occur in a communication system. Each layer in the OSI model covers a different function performed by the communication system.

The lowest layer in the OSI model, called the physical layer, specifies the physical structure of interfaces in a particular communication system or network. Thus, a standard for the physical layer of a communication system specifies such things as the number of wires, their electrical characteristics, the characteristics of signals transmitted over the wires, connectors used for joining two sets of wires into a single longer set of wires, etc.

The next higher layer in the OSI model, called the data link layer, specifies how data is transmitted error free through the communication system. Thus, a standard for the second layer in the OSI model specifies how to detect errors in transmissions passing over the physical layer, and how to correct any errors that may occur during transmission.

The next higher layer in the OSI model, called the network layer, specifies the manner in which connections are formed between various places in the communication system for transmitting data between them. The standard for the third layer in the OSI model, therefore, specifies the signals transmitted over the data link layer that cause the communication system to transfer data between two places on the network.

A standard defined by an International Telegraph and Telephone Consultative Committee ("CCITT") for the ISDN communication channel specifies these three lowest levels in the OSI model. Under the CCITT standard, a basic ISDN access consists of two full-duplex 64 kilobits per second ("kbps") digital data channels, called channel B1 and channel B2, plus another full-duplex 16-kbps digital channel, called a D channel. Under the CCITT standard, using time division multiplexing, all three of these digital data channels may be transmitted over a single pair of twisted wires, or over two pairs of twisted wires. ISDN basic access, as specified by CCITT, was originally intended to provide a basic digital data transmission capability suitable for use by individuals such as in their homes or small businesses.

When ISDN basic access was initially specified, each of the B channels was intended to carry either:

1. digital data, such as that from a personal computer or from a computer terminal;
2. Pulse Code Modulation ("PCM") encoded digital voice communication; or
3. a mixture of lower data rate communications including digital data and digitized voice that were each encoded at a fraction of each B channel's full 64-kbps capacity.

Under the ISDN specification, the D channel serves two purposes. First, the D channel carries signaling information that controls the transmission of data over the two B channels. In addition, when the D channel is not carrying signaling information, it may be used to transmit packet-switching or low-speed telemetry. The combined data rate at which digital data may be transmitted over twisted pairs of wires in accordance with the ISDN standard for basic access is 144-kbps, i.e. 128-kbps for the combined B1 and B2 channels plus 16-kbps for the D channel.

In addition to the ISDN basic access specified by CCITT, that organization has also specified a higher performance ISDN communication channel identified as ISDN primary access. An ISDN primary access provides twenty three 64-kbps B channels plus one 16-kbps D channel for a total capacity of approximately 1.5 megabits per second ("mbps"). CCITT envisions that ISDN primary access can be used for communications between an ISDN local exchange and an ISDN Private Branch Exchange ("PBX"). Moreover, a recent development in ISDN communication technology is directed toward providing a service called "bandwidth on demand" in which an ISDN primary access communication channel is not fixed at 23 B channels plus one D channel, but can vary in capacity from instant to instant depending upon the transitory need for communication capacity.

Because the CCITT standard for the ISDN communication channel specifies the lowest three layers of the OSI model, the ISDN standard provides interfaces, both physical, e.g., the plug in a wall, and logical, e.g., electrical signals passing through the plug. In achieving this result, the ISDN standard specifies several different physical interfaces, the most widespread of which is called the S interface. The S interface of the ISDN standard specifies the interface between Terminal Equipment ("TE"), e.g., a telephone, and a Network Termination ("NT") of the ISDN communication channel.

In North America, the S interface is the four wires usually found in a home telephone installation. In this interface, two of the four wires transmit data from the Network Termination to the Terminal Equipment, and two wires transmit data back from the TE to the NT. That is, the NT uses one pair of the four wires to transmit the combined B1, B2 and D channels of ISDN basic access to the TE, while the TE simultaneously transmits a different combined B1, B2 and D channels back to the NT on a different pair of the four wires.

While ISDN basic access was originally intended to provide voice and slow speed data communication services such as those identified above, over the years developments in digital signal processing and compression techniques have advanced technology to the extent that compressed video data may now be transmitted using ISDN basic access. These techniques have progressed to such an extent that there now exist several alternative video data compression techniques such as the CCITT H.261 picture phone standard, the Joint Photographic Experts Group ("JPEG") standard, and the Motion Picture Experts Group ("MPEG") standard.

U.S. Pat. No. 5,027,400, that issued Jun. 25, 1991, on an application filed in the names of Toru Baji et al. ("the Baji et al. patent"), discloses a multimedia bidirectional broadcasting system that distributes motion picture data using a broadband ISDN communication channel. In the system depicted in FIG. 3 of the Baji et al. patent, a motion picture program data base is maintained at a broadcasting station for transmission over broadband ISDN communication channels in response to requests received at the broadcasting station from subscriber systems. In the broadcasting station disclosed in the Baji et al. patent, an image encoder compresses a video signal prior to its transmission over the broadband ISDN communication channel to the subscriber system. The subscriber system includes a decoder for decoding the compressed video data and a television monitor for displaying them. Both the broadcasting stations and the subscriber systems disclosed in the Baji et al. patent transmit and receive video data compressed in accordance with a single compression standard.

FIGS. 1-1 through 2-1, 3, 4 13, 15, 20, 28, 32 and 35 of the Baji et al. patent disclose various different configurations for the subscriber system. FIG. 1-6 depicts a subscriber system adapted for use in a video mail application. In the video mail application, the subscriber system depicted in FIG. 1-6 transmits compressed video data back to the broadcasting station for storage there and subsequent re-transmission to a different subscriber system.

While various subscriber systems disclosed in the Baji et al. patent include a "graphic processor 141," it is capable of only simple screen operations such as the shift and drag of an icon. The graphic processor 141 disclosed in the Baji et al. patent is incapable of "realtime number crunching" required for more sophisticated screen operations. Consequently, to provide enhanced graphic capability at the subscriber system of the Baji et al. patent, the broadcasting station, such as that illustrated in FIG. 1-4, may include an image processing engine 187, for effecting time-consuming 3-dimensional graphics processing and the like, and various accelerators (processors) 188. Located in the broadcasting station, the image processing engine 187 and the accelerators 188 are time shared among many subscriber systems communicating with the broadcasting station.

In addition to the broadcasting station disclosed in the Baji et al. patent, a PCT patent application entitled "Adaptive Video File Server and Methods for Its Use," filed Feb. 11, 1992 in the names of Mark C. Koz and Masato Hata, discloses a video file server or broadcasting station that includes both a random access data storage subsystem and an archive data storage subsystem for storing compressed video data. In response to commands from subscriber systems, the video file server of this PCT patent application transmits compressed video data to the subscriber systems over communication lines, or receives compressed video data therefrom in accordance with a variety of different compression standards. Compression-decompression cards included in the video file server allow it to adaptively transmit and receive compressed video data compressed in accordance with a variety of different compression standards. The compression-decompression cards of the video file server also provide it with an authoring capability for storing compressed video and/or audio data in the random access data storage subsystem and/or archive data storage subsystem. This PCT patent application disclosing a video file server is incorporated herein by reference.

DISCLOSURE OF INVENTION

An object of the present invention is to provide a subscriber system that may receive and/or transmit video data compressed in accordance with a variety of different compression standards.

Another object of the present invention is to provide a subscriber system that may adaptively receive video data compressed in a manner most suited to the type of image being communicated.

Another object of the present invention is to provide a subscriber system that is capable of simultaneously sending and receiving video data adaptively compressed in a format most suited to the type of image being communicated.

Another objective of the present invention is to provide a subscriber system that adaptively uses only the amount of communication channel capacity required for the images being received and/or transmitted.

Briefly, in a preferred embodiment, a subscriber system in accordance with the present invention includes a control microprocessor for controlling the operation of the subscriber system. Also included in the subscriber system is a communication subsystem that responds to commands from the control microprocessor. The communication subsystem receives compressed data transmitted to the subscriber system and separates the data into compressed video data and compressed audio data.

The subscriber system includes a programmable video data format conversion subsystem that also responds to commands from the control microprocessor. The programmable video data format conversion subsystem receives compressed video data directly from the communication subsystem and converts it into video data. The programmable video data format conversion subsystem operates under control of a video data conversion computer program selected from a plurality of video data conversion computer programs by the control microprocessor. Each video data conversion computer program is capable of converting video data, compressed in accordance with a particular pre-specified conversion standard, into video data.

The video data produced by the programmable video data format conversion subsystem is transmitted to a video signal generation subsystem included in the subscriber system. The video signal generation subsystem, that also responds to commands from the control microprocessor, generates a video signal from the video data that it receives from the programmable video data format conversion subsystem. The video signal produced by the video signal generation subsystem is adapted for producing a visible image on a display such as a cathode ray tube ("CRT") included in a television or red-blue-green ("RGB") monitor, a liquid crystal display panel, a plasma panel, or any other suitable display device.

The subscriber system also includes a programmable audio data format conversion subsystem that responds to commands from the control microprocessor. Analogous to the programmable video data format conversion subsystem, the programmable audio data format conversion Subsystem receives compressed audio data and converts it into audio data. An audio signal generation subsystem included in the subscriber system, that also responds to commands from the control microprocessor, receives this audio data and generates an audio signal adapted for producing an audible sound using a speaker, earphone, etc.

The preferred embodiment of the subscriber system of the present invention also includes both a video data generation subsystem and an audio data generation subsystem. The video data generation subsystem, that also responds to commands from the control microprocessor, receives a video signal obtained from a visible image, for example a signal from a video camera, and generates video data from that video signal. Similarly, the audio data generation subsystem, that also responds to commands from the control microprocessor, receives an audio signal obtained from an audible sound, such as the signal produced by a microphone, and generates audio data from the audio signal. The video data and audio data, respectively generated by the video data generation subsystem and the audio data generation subsystem, are respectively transmitted to the programmable video data format conversion subsystem and the programmable audio data format conversion subsystem. These subsystems respectively convert the data into compressed data and transmit the data to the communication subsystem for transmission from the subscriber system. The preferred embodiment of the subscriber system is capable of concurrently receiving and transmitting both compressed video and audio data. Thus, in its preferred embodiment, the subscriber system is capable of full duplex video-phone type communication.

The programmable video data format conversion subsystem of the present invention allows the subscriber system to adapt to receiving and/or sending images in a variety of different compression standards, e.g., JPEG, MPEG, H.261, etc., during the course of a single communication session such as during a single telephone call. To accommodate the varying communication channel requirement that results from changing among various data compression standards, another aspect of the present invention relates to receiving and/or sending compressed data with the communication subsystem over a communication channel, such as an ISDN primary access communication channel, that provides "bandwidth on demand." When communicating over an ISDN primary access communication channel, the communication subsystem of the subscriber system of the present invention, responding to commands received from the control microprocessor, utilizes the "bandwidth on demand" capability of an ISDN primary access communication channel by varying the subscriber system's use of the channel's capacity from instant to instant depending upon the system's transitory communication requirements. Thus, a subscriber system in accordance with the present invention when communicating over a communication channel that provides the "bandwidth on demand" feature adaptively uses only that amount of the channel's capacity that is required for transferring the compressed data.

An advantage of a subscriber system in accordance with the present invention is that it can provide a real-time, visually interactive game playing environment for an individual present at the subscriber system.

Another advantage of the subscriber system the present invention is that it can provide a real-time, visually interactive game playing environment among players individually present at a plurality of subscriber system.

Another advantage of the subscriber system the present invention is that it can provide a security system that responds to movement by an intruder.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 depicts the relationship among FIGS. 1A, 1B and 1C, the combined FIGS. 1A, 1B and 1C depicting a subscriber system in accordance with the present invention; and FIGS. 1A, 1B and 1C make up a functional block diagram that depicts a subscriber system in accordance with the present invention including its control microprocessor, communication subsystem, its programmable video data format conversion subsystem, its video signal generation subsystem, its video data generation subsystem, its programmable audio data format conversion subsystem, its audio signal generation subsystem, and its audio data generation subsystem.

BEST MODE FOR CARRYING OUT THE INVENTION

Figure 1A:
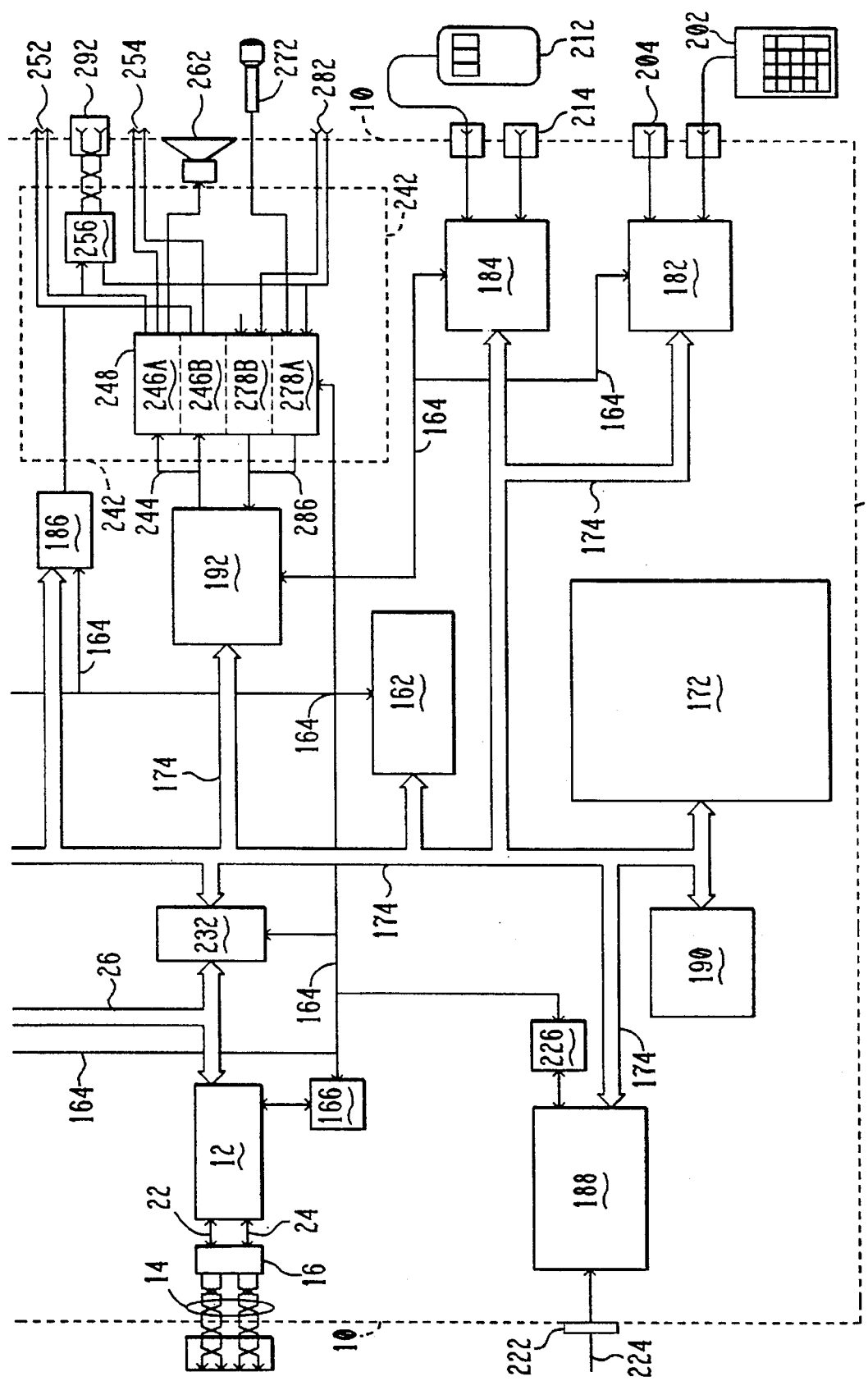
Figure 1B:
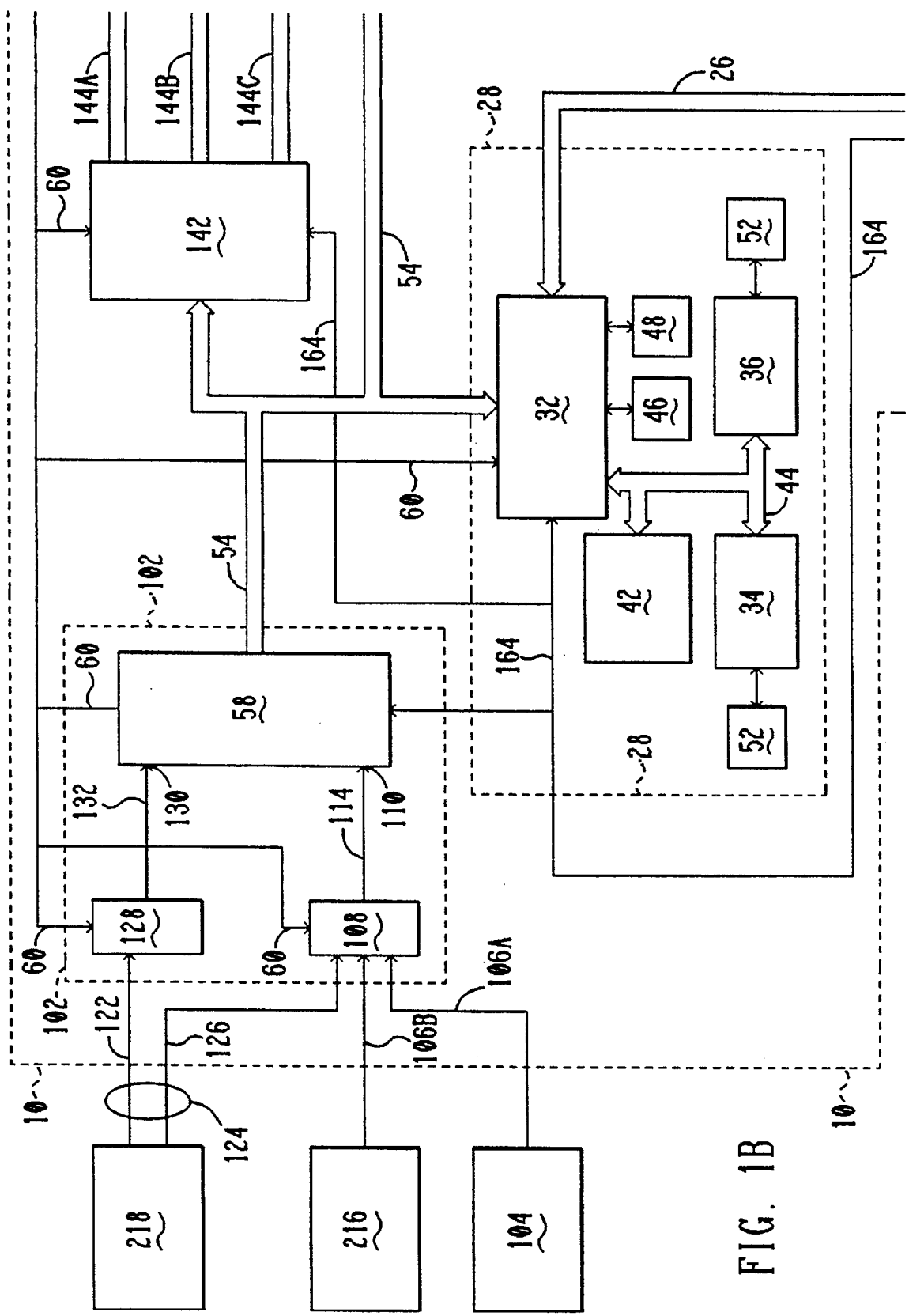

FIGS. 1A, 1B and 1C depict a subscriber system in accordance with the present invention enclosed within a dashed line 10. Referring now to FIG. 1A, the subscriber system 10 includes a communication subsystem 12 for receiving and/or transmitting compressed data over a communication channel such as an ISDN primary access line 14. The communication subsystem 12 includes a TMS320C25 digital signal processor Integrated Circuit ("IC"). The TMS320C25 digital signal processor is more completely described in the "Texas Instrument DSP Hand Book" and is manufactured by Texas Instruments Incorporated of Dallas, Tex. In addition to the TMS320C25 IC, the communication subsystem 12 preferably also includes a Read Only Memory ("ROM") containing a program that is executed upon "booting" the subscriber system 10, and 512k bytes of random access memory ("RAM").

An ISDN interface circuit 16, located between the communication subsystem 12 and the ISDN primary access line 14, exchanges signals over buses 22 and 24 with the TMS320C25 digital signal processor to adapt the communication subsystem 12 for exchanging compressed data over the ISDN primary access line 14. The interface circuit 16 used for an ISDN primary access line may be a Dallas Semiconductor DS2280 T1 Line Card Stik™. The Dallas DS2280 is more completely described in an "Dallas Semiconductor Handbook" and is manufactured by Dallas Semiconductor of Dallas, Tex. Other circuits may be used instead of the Dallas Semiconductor DS2280 to adapt the communication subsystem 12 for use with an ISDN basic access line rather than a primary access line.

Producing a Visible Image

Upon receiving compressed data over the ISDN primary access line 14 that contains both compressed video data and compressed audio data, a computer program controlling the operation of the communication subsystem 12 separates the compressed video data from the compressed audio data. After the communication subsystem 12 separates the compressed data into compressed audio data and compressed video data, it then transmits the compressed video data over a compressed video data bus 26 to a programmable video data format conversion subsystem, herein referred to as a CODEC, enclosed within a dashed line 28 in FIG. 1B. The CODEC 28 includes an Integrated Information Technology, Inc. ("IIT") Vision Controller ("VC") IC 32, and a pair of IIT Vision Processor ("VP") ICs 34 and 36. The VC IC 32 and the VP ICs 34 and 36 are manufactured by Integrated Technology, Inc. of Santa Clara, Calif. In addition to the VC IC 32 and the VP ICs 34 and 36, the CODEC 28 includes a 2M byte or larger frame buffer dynamic RAM 42 that is accessed via a CODEC bus 44 by the VC IC 32 and the VP ICs 34 and 36. The CODEC 28 also includes a 32 k byte boot ROM 46 and a 64 k byte static RAM 48 that are accessible only to the VC IC 32. Analogously, each VP IC 34 and 36 accesses its own 32k byte static RAM 52.

Upon receiving compressed video data from the communication subsystem 12, a computer program executed by the VC IC 32 in the CODEC 28 performs Huffman decoding on the compressed video data. The VC IC 32 then supplies the Huffman decoded video data to either one or the other of the two VP ICs 34 or 36, and supervises decompression of the video data by the VPIC 34 or 36. After the decompression of the video data by the VPIC 34 or 36, the VC IC 32 generates digital pixel video data from the decompressed video data, and transmits the video data thus obtained over a video data bus 54 to a first-in first out ("FIFO") IC 56 illustrated in FIG. 1C. In response to timing signals transmitted to the FIFO 56 from a SAA7191 Digital Multistandard Decoder—Square Pixel ("DMSD-SQP") 58 (illustrated in FIG. 1B) via a video timing signal bus 60, the FIFO 56 transmits video data to a video multiplexer 62 over a first multiplexer input bus 64.

In addition to receiving video data from the FIFO 56, the video multiplexer 62 also receives multiplexer control data from the serial port of a multiplexer control data video RAM 66 via a multiplexer control data bus 68. Similar to the transmission of video data from the FIFO 56 to the video multiplexer 62, the transmission of multiplexer control data from the multiplexer control data video RAM 66 to the video multiplexer 62 occurs in response to timing signals supplied by the DMSD-SQP 58 to the multiplexer control data video RAM 66 via the video timing signal bus 60. As commanded by the multiplexer control data supplied to the video multiplexer 62 from the multiplexer control data video RAM 66, the video multiplexer 62 transmits selected portions of the video data received from the FIFO 56 over a multiplexed video data bus 72 to a video signal generation subsystem enclosed within a dashed line 74.

The video signal generation subsystem 74 includes a Bt473 RAMDAC™ IC 76 manufactured by Brooktree Corporation of San Diego, Calif. In response to the video data supplied to the RAMDAC™ 76 from the video multiplexer 62 via the multiplexed video data bus 72 and also in response to timing signals supplied to the RAMDAC™ 76 via the video timing signal bus 60 from the DMSD-SQP 58, the RAMDAC™ 76 generates either RS-343A or RS-170 compatible video signals. If the RAMDAC™ 76 produces RS-343A video signals, then the video signals are supplied as red-green-blue ("RGB") video signals via a RGB bus 78 directly to a color cathode ray tube ("CRT") 82 included in an RGB monitor for producing a visible image on the CRT 82. If the RAMDAC™ 76 produces RS-170 video signals, the RGB video signals are supplied to a BAL7230LS RGB Encoder for National Television Systems Committee ("NTSC") IC 84 manufactured by ROHM Co., Ltd. of Kyoto, Japan. The RGB Encoder IC 84 converts the RGB video signals that it receives via the RGB bus 78 into a NTSC color composite video signal. The NTSC color composite video signal is transmitted from the RGB Encoder IC 84 via a composite video signal output line 86 to the CRT 82 included in a color television set for producing a visible image on the CRT 82. The RGB Encoder IC 84 also produces chroma and luminance signals that are transmitted from the subscriber system 10 via a chroma output line 92 and a luminance output line 94 of a video output signal bus 96 for creating a visible image on a CRT 82 included in a component video monitor.

While the ITT VC and VP IC are preferred for the CODEC 28, the CODEC 28 may also be assembled using VDSP-1 Video and Image Digital Signal Processor ICs manufactured by Matsushita Electric Industrial Co. Ltd. of Osaka, Japan.

Transmitting Compressed Video Data

The subscriber system 10 also includes a video data generation subsystem enclosed within a dashed line 102 in FIG. 1B. The video data generation subsystem 102 receives a color composite video signal obtained from a visible image by a video camera 104 via either one or the other of two composite video signal input lines 106A and 106B. The composite video signal from the video camera 104 is supplied to a composite-and-luminance analog-to-digital converter ("ADC") 108 via either one of the composite video signal input lines 106A or 106B. The composite-and-luminance ADC 108 is preferable a TDA8708 Video Analog Input Interface IC manufactured by Philips Components-Signetics of Sunnyvale, Calif. The composite-and-luminance ADC 108 may select the signal present on either one or the other of the composite video signal input lines 106A or 106B and digitizes the selected signal in synchronization with timing signals supplied to the composite-and-luminance ADC 108 by the DMSD-SQP 58 via the video timing signal bus 60.

The digitized video signal produced by the composite-and-luminance ADC 108 from a composite video signal is transmitted to CVBS-or-Y input 110 of the DMSD-SQP 58 via a first digitized video signal bus 114. The DMSD-SQP 58, which is manufactured by Philips Components-Signetics of Sunnyvale, Calif., processes the digitized video signal from the composite-and-luminance ADC 108 to obtain both the video timing signals, and video data. While a DMSD-SQP 58 IC by itself produces the basic video timing signals necessary for the subscriber system 10, the preferred embodiment of the subscriber system 10 includes additional circuitry for generating a more precise vertical synchronization signal from the horizontal synchronization signal produced by the DMSD-SQP 58, or conversely.

Instead of receiving color composite video signals, the video data generation subsystem 102 may receive a chroma signal via a chroma input signal line 122 of a video input signal bus 124, and a luminance signal via a luminance input signal line 126 of the bus 124. If the video data generation subsystem 102 receives chroma and luminance signals instead of composite video signals, the composite-and-luminance ADC 108 selects and digitizes the luminance signal on the luminance input signal line 126 while a chroma ADC 128 selects and digitizes the chroma signal on the chroma input signal line 122. The chroma ADC 128 is preferably a TDA8709 Video Analog Input Interface IC manufactured by Philips Components-Signetics of Sunnyvale, Calif. The digitized video signal produced by the composite-and-luminance ADC 108 is supplied to the DMSD-SQP 58 via the first digitized video signal bus 114 while the digitized video signal produced by the chroma ADC 128 is supplied to a chrominance input 130 of the DMSD-SQP 58 via a second digitized video signal bus 132. The DMSD-SQP 58 processes the digitized video signals that it receives on the buses 114 and 132 to produce video timing signals and video data in a manner similar to its processing described previously for a digitized composite video signal.

The uncompressed video data produced by the DMSD-SQP 58 is transmitted via the video data bus 54 to the VC IC 32 included in the CODEC 28. A computer program executed by the VC IC 32 controls the passage of data through the CODEC 28, and the processing of that data into Huffman encoded compressed video data by the VC IC 32 and by one or the other of the two VP ICs 34 or 36. In receiving video data from the DMSD-SQP 58, the VC IC 32 operates in synchronism with timing signals supplied to the VC IC 32 from the DMSD-SQP 58 via the video timing signal bus 60. In processing video data received from the DMSD-SQP 58, the VC IC 32 preprocesses that data, supplies the preprocessed video data to either one or the other of the two VP ICs 34 or 36, and supervises compression of the video data by the VP IC 34 or 36. After the VP IC 34 or 36 compresses the video data, the VC IC 32 performs Huffman coding on the compressed data, and transmits the now Huffman encoded compressed video data via the compressed video data bus 26 to the communication subsystem 12 illustrated in FIG. 1A. The communication subsystem 12 then merges the compressed video data from the CODEC 28 with compressed audio data for transmission over the ISDN primary access line 14.

Simultaneous Reception and Transmission

Because the CODEC 28 illustrated in FIG. 1B includes two VP ICs 34 and 36, the CODEC 28 can use the VC IC 32 and one of the VP ICs 34 or 36 to compress video data received over the video data bus 54 from the DMSD-SQP 58 of the video data generation subsystem 102 and transmit the compressed video data to the communication subsystem 12 while simultaneously using the VC IC 32 and the other VP IC 36 or 34 to decompress compressed video data received from the communication subsystem 12 and transmit decompressed video data over the video data bus 54 to the FIFO 56. Because the VC IC 32, the VP IC 34, and the VP IC 36 all operate under software control, they may be readily adapted to compress or to decompress video data in accordance with the H.261, the JPEG or the MPEG standards, or in accordance with a video compression technique developed at some future date.

The CODEC 28 illustrated in FIG. 1B is capable of simultaneously decompressing and compressing frames of video data at only a 30 Hz rate. The rate at which the CODEC 28 may simultaneously decompress and compress frames of video data may be easily increased to a 60 Hz rate by the addition of a second VC IC and its associated boot ROM 46 and static RAM, a third VP IC and its associated static RAM, and a second frame buffer dynamic RAM. In such an enhanced CODEC 28, the second VC IC, the third VP IC, and the second frame buffer dynamic RAM are dedicated to decompressing compressed video data received from the communication subsystem 12 while the VC IC 32, the VP IC 34 or 36, and the frame buffer dynamic RAM 42 are dedicated to compressing video data received from the video data generation subsystem 102.

Picture in a Picture

In addition to supplying timing signals to the video timing signal bus 60 and video data to the VC IC 32 of the CODEC 28, the DMSD-SQP 58 also supplies the compressed video data to a CL-Px0070 Video Window Generator ("VWG") 142. The VWG 142, that is manufactured by Cirrus Logic, Inc. of Fremont Calif., performs real-time interpolated scaling operations on the video data produced by the DMSD-SQP 58, and can arbitrarily scale and clip that digitized video signal. The scaling and clipping of the digitized video signal by the VWG 112 produces a window of pixel video data separated into its red-green-blue color components.

The components of this red-green-blue video data produced by the VWG 142 are respectively transmitted over a red data path 144A, a green data path 144B, and a blue data path 144C of an image data bus 146 to the parallel input ports of a red video RAM 148A, a green video RAM 148B, and a blue video RAM 48C. In response to timing signals supplied to the video RAMs 148A–C via the video timing signal bus 60 from the DMSD-SQP 58, the video RAMs 148A–C transmit the red-green-blue video data produced by the VWG 142 from their serial ports to over a second multiplexer input bus 64 to the video multiplexer 62. As described previously, operating in response to multiplexer control data supplied to the video multiplexer 62 from the serial port of a multiplexer control data video RAM 66 via a multiplexer control data line 68, the video multiplexer 62 transmits selected portions of the video data received from the FIFO 56 or of the red-green-blue video data received from the video RAMs 148A–C to the video signal generation subsystem 74.

Depending upon information contained in the multiplexer control data stored in the multiplexer control data video RAM 66, the visible image appearing on the CRT 82 can consist entirely of the video data from the FIFO 56, entirely of the red-green-blue image data from the video RAMs 148A–C, or can be a composite image made up of data from both of these sources. In addition to decompressing compressed video data, the computer programs executed by the CODEC 28 also window the video data transmitted to the FIFO 56. Thus, depending precisely upon how the CODEC 28 decompressed the compressed video data and precisely how the VWG 142 processed the video data from the DMSD-SQP 58, the image on the CRT 82 produced by the data from one of these sources may occupy a larger area than that occupied by the data from the other source. Therefore, storage of appropriate multiplexer control data in the multiplexer control data video RAM 66 can result in the larger of these two images appearing as a background filling the entire area of the CRT 82 while the smaller of these two images appears on the CRT 82 as a smaller window somewhere within the larger, background image.

Control of Subscriber System 10

Operation of the various elements of the subscriber system 10 described thus far is supervised by a control microprocessor 162 illustrated in FIG. 1A. The control microprocessor 162 is preferably a Motorola MC68EC030 microprocessor that is more completely described in a "Motorola Semiconductor Technical Data" sheet MC68EC030/D, copyright Motorola Inc., 1991, that is incorporated herein by reference. The control microprocessor 162 exchanges control signals with the various parts of the subscriber system 10 via a control signal bus 164. Thus, a computer program executed by the control microprocessor 162 causes the transmission of control signals over the control signal bus 164 from the control microprocessor 162 to a Programmable Array Logic Integrated Circuit ("PAL") 166 for the communication subsystem 12, to the VC IC 32 in the CODEC 28, to the composite-and-luminance ADC 108 and the chroma ADC 128 in the video data generation subsystem 102, to the DMSD-SQP 58, to the VWG 142, and to the RAMDAC™ 76 and the RGB Encoder IC 84 in the video signal generation subsystem 74. Control signals from the control microprocessor 162 may select various features of the DMSD-SQP 58 such as enabling the processing of either Phase Alternation Line ("PAL") or National Television Systems Committee ("NTSC") video signals. Analogously, control signals form the control microprocessor 162 may specify details of and parameters for window processing performed by the VWG 142. For the CODEC 28, the control signals received over the control signal bus 164 may select the compression and/or decompression computer program to be executed, e.g. a H.261, MPEG or JPEG computer program, the size and location of the image being compressed or decompressed, video timing, etc. Control signals from the control microprocessor 162 to the communication subsystem PAL 166 enable the subsystem 12 for reception and transmission of compressed data to or from the subscriber system 10 via the ISDN primary access line 14. Due to signal incompatibilities between the control microprocessor 162 and the preferred embodiment of the communication subsystem 12, the communication subsystem PAL 166 is required for an exchange of control signals between them.

The computer program executed by the microprocessor 162 to control the operation of the subscriber system 10 resides in a 4M byte Erasable Programmable Read Only Memory ("EPROM") 172, and is transferred over a control processor bus 174 from the EPROM 172 to the control microprocessor 162 for execution by the microprocessor 162. In addition to interconnecting the control microprocessor 162 and the EPROM 172, the control processor bus 174 also connects to a keyboard controller 182, a serial controller 184, a sound generator 186, a SCSI controller 188, a 512k byte RAM 190, a programmable audio data format conversion subsystem 192, and the multiplexer control data video RAM 66 illustrated in FIG. 1C.

The keyboard controller 182, preferably an 82530 IC manufactured by Intel Corporation of Santa Clara, Calif., responsive to control signals received from the control microprocessor 162 via the control signal bus 164, exchanges signals with a keypad 202 preferably having 28 keys. An operator of the subscriber system 10 may use the keypad 202 for entering commands to control the operation of the subscriber system 10, and also for entering commands to control the operation of a video file server that is supplying compressed data to the subscriber system 10 over the ISDN primary access line 14. For a more complete description of a video file server adapted for supplying the subscriber system 10 with compressed data, refer to the PCT patent application entitled "Adaptive Video File Server and Methods for Its Use," filed Feb. 11, 1992 in the names of Mark C. Koz and Masato Hata, that is incorporated herein by reference. In addition to the keypad 202, the preferred embodiment of the subscriber system 10 includes a keyboard plug 204 adapted for interconnecting the keyboard controller 182 to a full 101 key personal computer type keyboard.

The serial controller 184, preferably an 8042 IC manufactured by Intel Corporation of Santa Clara, Calif., responsive to control signals received from the control microprocessor 162 via the control signal bus 164, exchanges signals with a mouse 212. Interacting with the image appearing on the CRT 82, an operator of the subscriber system 10 can enter commands into the subscriber system 10 by moving a cursor displayed on the CRT 82 for selecting menu items appearing there. Depending upon specific details of the computer program executed by the control microprocessor 162, the type and range of commands to the subscriber system 10 that may be selected with the mouse 212 may completely duplicate, and even exceed, those that can be entered through the keypad 202.

In addition to the mouse 212, the preferred embodiment of the subscriber system 10 includes a S-bus plug 214 adapted for interconnecting and exchanging control signals with various different devices including video devices. An example of such a video device whose operation may be controlled by signals transmitted through the S-bus plug 214 is a VCR 216 illustrated in FIG. 1B. Alternatively, signals transmitted through the S-bus plug 214 may control the operation of a component VCR 218. As depicted FIG. 1B, the component VCR 218 supplies chroma and luminance signals for video images to the video data generation subsystem 102. Analogously to the VCR 216 and/or the component VCR 218, control signals passing through the S-bus plug 214 may control the operation of either a VCR or a component VCR (not illustrated in any of the FIGS.) connected for recording video signals respectively present on either the composite video signal output line 86 or the video output signal bus 96. Depending upon precise details of the computer program executed by the control microprocessor 162, a VCR or a component VCR connected to either the composite video signal output line 86 or to the video output signal bus 96 can automatically record video images transmitted to the subscriber system 10 via the ISDN primary access line 14. Similarly, depending upon precise details of the computer program executed by the control microprocessor 162, upon precise details of the video program present in the VCR 216 or the component VCR 218, upon precise details of whether a VCR or a component VCR is connected to the composite video signal output line 86 or to the video output signal bus 96, and upon precise details of whether either the line 86 or the bus 96 are suitably connected respectively to the VCR 216 or to the component VCR 218; control signals supplied through the S-bus plug 214 may cause the subscriber system 10 to operate as a telephone answering machine for video telephone communications.

The SCSI controller 188, a MB86602 SCSI protocol controllers manufactured by Fujitsu VLSI Inc., provides a port 222 for a SCSI bus 224 via which the subscriber system 10 may exchange commands and data with a variety of different computer peripheral devices such as hard and/or floppy disks, a Digital Audio Tape ("DAT"), a CD-ROM drive, an optical disk unit, a printer, a scanner, a plotter, etc. The SCSI controller 188 exchanges control signals with the control microprocessor 162 over the control signal bus 164 via a SCSI PAL 226. Similar to the communication subsystem PAL 166, the SCSI PAL 226 signal incompatibilities between the control microprocessor 162 and the preferred embodiment of the SCSI controller 188, the communication subsystem PAL 166 is required for an exchange of control signals between them.

Audio Decompression and Compression

The subscriber system 10 also includes a compressed data buffer 232 for selectively coupling together the compressed video data bus 26 and the control processor bus 174 in response to control signals transmitted to the compressed data buffer 232 from the control microprocessor 162 via the control signal bus 164. The ability to selectively couple the compressed video data bus 26 to the control processor bus 174 permits the transfer of compressed audio data, that the subscriber system 10 receives over the ISDN primary access line 14, from the communication subsystem 12 to the RAM 190. Once compressed audio data becomes present in the RAM 190, it may then be conveniently transferred over the control processor bus 174 to the conversion subsystem 192 for conversion in to audio data.

Similar to the communication subsystem 12, the conversion subsystem 192 includes a TMS320C25 IC. In addition to the TMS320C25 IC, each conversion subsystem 192 includes a boot ROM and static RAM that are not separately depicted in FIG. 1A. Analogous to the CODEC 28, the control microprocessor 162 can command the conversion subsystem 192 to execute a particular one of several computer programs either for decompressing compressed audio data into an audio signal, or for compressing an audio signal into compressed audio data. Each of these computer programs is adapted for the decompression of compressed audio data or the compression of an audio signal in accordance with a pre-specified compression standard such as the CCITT standard G.711 or G.722, that adapt audio data for transmission over an ISDN communication channel.

Audio data obtained by decompressing compressed audio data with the conversion subsystem 192 is transmitted from the conversion subsystem 192 to an audio signal/data generation subsystem 242 via a audio data output bus 244. Within the audio signal/data generation subsystem 242, the audio data is supplied over the audio data output bus 244 to two Digital-to-Analog Converters ("DACs") 246A and 246B included in a CS4215 Stereo Audio Codec IC 248 manufactured by Crystal Semiconductor Corporation of Austin, Tex. Upon receiving the audio data from the conversion subsystem 192, responsive to control signals received from the control microprocessor 162 via the control signal bus 164, the DAC 246A converts the digitized audio data into audio signals. Audio signals produced by the DACs 246A and 246B are supplied directly to both a line-out jack 252 and a headphone jack 254. The line-out audio signal produced by the DAC 246A is also supplied to a telephone interface circuit 256. The DAC 246A also supplies an audio output signal to a speaker 262 for producing an audible sound.

Because the Stereo Audio Codec 248 includes two DACs 246A and 246B, by supplying stereo audio data from the conversion subsystem 192 to both of the DACs 246A and 246B, the audio signal present at the line-out jack 252 can be a stereo signal rather than just a monaural signal. Moreover, connecting the line-out jack 252 to audio inputs of a VCR or component VCR connected respectively to the composite video signal output line 86 or to the video output signal bus 96 permits recording both the video and audio information present in compressed data received by the subscriber system 10.

The subscriber system 10 also includes a microphone 272 that produces an audio signal in response to an audible sound. The microphone 272 supplies its audio signal to an ADC 278A that is one of two ADCs 278A and 278B included in the Stereo Audio Codec 248. A stereo signal may be supplied directly to both ADCs 278A and 278B from a line-in jack 282. The telephone interface circuit 256 supplies only a single audio signal to the ADC 278A. Responsive to control signals received from the control microprocessor 162 via the control signal bus 164, the ADCs 278A and 278B digitize the audio signals received either from the microphone 272, from the line-in jack 282, or from the telephone interface circuit 256 to generate audio data. The audio data generated by the ADCs 278A and 278B is then transmitted via an audio data input bus 286 to the conversion subsystem 192.

Upon receiving audio data from the ADCs 278A and 278B, the computer program executed by the conversion subsystem 192 compresses the audio data in accordance with a compression standard selected from the numerous different existing audio compression standards, or in accordance with a audio compression technique developed at some future date. The compressed audio data thus produced by the conversion subsystem 192 is then transferred over the control processor bus 174 from the conversion subsystem 192 to the RAM 172. Compressed audio data present in the RAM 190 may then be transmitted over the control processor bus 174 through the compressed data buffer 232 to the communication subsystem 12 for transmission from the subscriber system 10 via the ISDN primary access line 14.

When the subscriber system 10 is only receiving compressed audio data, the TMS320C25 is capable of decompressing two channels of compressed stereo audio data. Similarly, if the subscriber system 10 is only transmitting compressed audio data, the TMS320C25 can compress two channels of stereo audio data. However, when the subscriber system 10 operates as a video telephone to both receive and transmit compressed data containing both compressed video data and compressed audio data, the TMS320C25 can only decompress only a single channel of compressed audio data for transmission to the DAC 246A while compressing a single channel of audio data from the ADC 278A.

The telephone interface circuit 256 receives an audio signal from the Stereo Audio Codec 248 and may supply an audio signal to the Stereo Audio Codec 248. The telephone interface circuit 256 exchanges both of these audio signals with a RJ-11 telephone jack 292 included in the subscriber system 10. By providing the RJ-11 telephone jack 292, the subscriber system 10 of the present invention permits conventional telephone set or facsimile machine communication via an ISDN primary access line 14.

In addition to decompressing and compressing audio data, the TMS320C25 also generates Dual Tone Multi Frequency ("DTMF") signals in response to commands received from the control microprocessor 162. DTMF signals are used to for telephone dialing, and to transmit commands for controlling the transmission of compressed video data from a video file server.

Image Generation by the Control Microprocessor

In addition to connecting to the compressed data buffer 232, the control processor bus 174 also connects to a video data buffer 302 that selectively couples together the image data bus 146 and the control processor bus 174 in response to control signals transmitted to the compressed data buffer 232 from the control microprocessor 162 via the control signal bus 164. By coupling together the image data bus 146 and the RAM 190, the control microprocessor 162 can read red-green-blue image data from the video RAMs 148A-C, or can write red-green-blue image data into the video RAMs 148A-C. Using this latter technique, the computer program executed by the control microprocessor 162 can present the full range of computer generated video images such as text, icons, lists, computer video games, etc. on the CRT 82. For example, the computer program executed by the control microprocessor 162 can cause both a menu and a cursor to appear on the CRT 82 after which the mouse 212 may be used to select an item from the menu for controlling the operation of the subscriber system 10.

In addition to writing red-green-blue image data to the video RAMs 148A-C, the computer program executed by the control microprocessor 162 may at any time write multiplexer control data directly to the multiplexer control data video RAM 66 without activating the video data buffer 302 to couple the image data bus 146 to the control processor bus 174. Thus, the computer program executed by the control microprocessor 162 may at any time specify on a pixel by pixel basis whether a particular pixel appearing on the CRT 82 will be video data from the FIFO 56 or image data from the video RAMs 148A-C. A primary use for this capability of the computer program executed by the control microprocessor 162 to write multiplexer control data into the multiplexer control data video RAM 66 is specifying the area in which a small window containing one image appears on the CRT 82 within a larger image.

Control Microprocessor Generated Audio

The subscriber system 10 also includes a sound generator 186 that responds to control signals transmitted from the control microprocessor 162 to the sound generator 186 over the control signal bus 164. The sound generator 186 is preferably a Yamaha YM3812 FM Operator Type-LII (OPL II) IC manufactured by Nippon Gakki Co., Ltd. The sound generator 186 produces an audio signal that is supplied to one contact of the line-out jack 252 for producing an audible sound. A primary use of the sound generator 186 by the control microprocessor 162 is the generation of sounds to accompany computer generated images appearing on the CRT 82 such as during the presentation of a video game.

Programmability of the Subscriber System 10

Because the conversion subsystem 192 is directly coupled to the control processor bus 174, the computer program executed by the conversion subsystem 192 for decompressing compressed audio data and for compressing audio data may be readily changed by the computer program executed by the control microprocessor 162. Different computer programs for decompressing and for compressing audio data may be readily transferred from the RAM 190 to the conversion subsystem 192. An analogous transfer of computer programs for compressing and decompressing video data in accordance with one of the compression standards may also occur between the RAM 190 and the CODEC 28 through the compressed data buffer 232. Correspondingly, the computer program executed by the control microprocessor 162 may communicate with the communication subsystem 12 via the control signal bus 164 and through the compressed data buffer 232 to effect utilization of the "bandwidth on demand" feature of the ISDN primary access line 14 by the communication subsystem 12.

Industrial Applicability

While the subscriber system 10 described above specifically focuses on the use of a CRT 82 for displaying images, the subscriber system 10 may be readily adapted to display images on all other forms of electronic display technology such as projection television displays, liquid crystal displays ("LCDs") and plasma panel displays.

By attaching a sufficiently large hard disk, a DAT unit, or an optical disk to the SCSI bus 224 of the subscriber system 10, it possible for the subscriber system 10 to capture compressed data for storage on such a device, and to transmit and display compressed data stored there. For example, in a video mail or video telephone answering machine application, compressed video and audio data of a message to be transmitted at the beginning of each call can be captured using the subscriber system 10 and stored on the hard disk or other device. Subsequently when a telephone call arrives at the subscriber system 10, that compressed data can be transferred from the hard disk or other device to the communication subsystem 12 for transmission directly from the subscriber system 10. At the same time a VCR or component VCR respectively connected to the composite video signal output line 86 or to the video output signal bus 96 can be activated by control signals transmitted from the S-bus plug 214 to record the compressed data being received by the subscriber system 10. Alternatively, that compressed data can be stored directly on the hard disk or other device for later decompression and presentation.

While the preceding disclosure has been generally made with reference to an ISDN primary access communication channel, the subscriber system 10 of the present invention may be readily adapted for use with other comparatively narrow bandwidth communication channels other than ISDN communication channels. Such alternative communication channels include mere twisted wire pairs within only a single building or a portion of a building, for example, a school or a Karaoke business establishment. Conversely, the subscriber system 10 of the present invention is also readily adaptable for use with digital communication channels capable of a much higher data transfer rates than that provided by ISDN primary access. Thus, it is envisioned that the subscriber system 10 of the present invention may be readily adapted for communicating over a Very Small Aperture Terminal ("VSAT") communication channel, or over any type of digital communication channel, including both electronic or optical digital communication channels whether dedicated or shared, including shared digital communication channels provided by local area networks such as Ethernet®, token ring, or ArcNet®.

When compressing video data of images, depending upon the characteristics of the particular image compression technique being employed, the quantity of data in each successive image in a sequence of images can vary greatly if there is no motion in the images and then motion suddenly occurs. If the computer program executed by the control microprocessor 162 monitors the quantity of data in each image in a sequence of images, the subscriber system 10 can sense the presence of an intruder entering or moving about in an area being monitored by the video camera 104. In response to detecting an intruder, the subscriber system 10 can automatically place a telephone call to a security headquarters notifying it of the intrusion, and then transfer compressed video data over the ISDN primary access line 14 for viewing and/or recording at the security headquarters.

In principle, the subscriber system 10 may be used stand-alone in playing games in which an image of the player is captured by the video camera 104. For example, a computer program executed by the control microprocessor 162 could conduct a "quick draw" game and by analyzing an image of a contestant to determine if the contestant moves before movement is permitted. Alternatively, if a plurality of subscriber systems 10 are in communication with a properly programmed video file server, individuals at such subscriber systems 10 may participate in a joint game in which contestants are able to visually observe each other.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A subscriber system adapted for receiving compressed data and for generating from the received data video and audio signals respectively adapted for producing a visible image and an audible sound, said subscriber system comprising:

a control microprocessor for controlling the operation of the subscriber system;

a communication subsystem, responsive to commands from said control microprocessor, for receiving compressed data transmitted to said subscriber system, and for separating the compressed data into compressed video data and compressed audio data;

a programmable video data format conversion subsystem, responsive to commands from said control microprocessor, for receiving compressed video data directly from said communication subsystem and for converting received compressed video data into video data, said programmable video data format conversion subsystem operating under control of a video data conversion computer program selected from a plurality of video data conversion computer programs by said control microprocessor, each video data conversion computer program being capable of converting video data compressed in accordance with a particular pre-specified conversion standard into video data;

a video signal generation subsystem, responsive to commands from said control microprocessor, for receiving video data from said programmable video data format conversion subsystem, and for generating from the received video data a video signal adapted for producing a visible image;

a programmable audio data format conversion subsystem, responsive to commands from said control microprocessor, for receiving compressed audio data, and for converting received compressed audio data into audio data, said programmable audio data format conversion subsystem operating under control of an audio data conversion computer program selected from a plurality of audio data conversion computer programs by said control microprocessor, each audio data conversion computer program being capable of converting audio data compressed in accordance with a particular pre-specified conversion standard into audio data; and an audio signal generation subsystem, responsive to commands from said control microprocessor, for receiving audio data from said audio data format conversion subsystem, and for generating from the received audio data an audio signal adapted for producing an audible sound.

2. The subscriber system of claim 1 further comprising a video data generation subsystem, responsive to commands from said control microprocessor, for receiving a video signal obtained from a visible image, and for generating video data from said received video signal; said video data generation subsystem transmitting the video data to said programmable video data format conversion subsystem; said programmable video data format conversion subsystem converting the video data received from said video data generation subsystem into compressed video data and transmitting the compressed video data to said communication subsystem for transmission from said subscriber system.

3. The subscriber system of claim 2 wherein said programmable video data format conversion subsystem operates under control of a video data conversion computer program selected from a plurality of video data conversion computer programs by said control microprocessor for converting video data into compressed video data, each video data conversion computer program being capable of converting video data into compressed video data in accordance with a particular pre-specified conversion standard.

4. The subscriber system of claim 2 wherein said subscriber system receives compressed video data and generates the video signal adapted for producing a visible image concurrently with receiving the video signal obtained from a visible image and transmitting the compressed video data produced therefrom.

5. The subscriber system of claim 4 further comprising an audio data generation subsystem, responsive to commands from said control microprocessor, for receiving an audio signal obtained from an audible sound, and for generating audio data from said received audio signal; said audio data generation subsystem transmitting the audio data to said programmable audio data format conversion subsystem; said programmable audio data format conversion subsystem converting the video data received from said audio data generation subsystem into compressed audio data and transmitting the compressed audio data to said communication subsystem for transmission from said subscriber system.

6. The subscriber system of claim 5 wherein said programmable audio data format conversion subsystem operates under control of an audio data conversion computer program selected from a plurality of audio data conversion computer programs by said control microprocessor for converting audio data into compressed audio data, each audio data conversion computer program being capable of converting audio data into compressed audio data in accordance with a particular pre-specified conversion standard.

7. The subscriber system of claim 5 wherein said subscriber system receives compressed audio data and generates the audio signal adapted for producing an audible sound concurrently with receiving the audio signal obtained from an audible sound and transmitting the compressed audio data produced therefrom.

8. The subscriber system of claim 1 wherein said communication subsystem is adapted for receiving data from a communication channel that provides bandwidth on demand; said communication subsystem, in response to commands received from said control microprocessor, varying the capacity of said communication channel used by said subscriber system from instant to instant responsive to the transitory communication requirements of said subscriber system.

9. The subscriber system of claim 1 wherein said subscriber system receives compressed data from a video file server, said subscriber system further comprising a keypad for entering into said subscriber system commands for controlling the transmission of compressed data to said subscriber system from said video file server, said communication subsystem of said subscriber system transmitting such commands to said video file server.

10. The subscriber system of claim 1 wherein said subscriber system receives compressed data from a video file server, said subscriber system further comprising a mouse for entering into said subscriber system commands for controlling the transmission of compressed data to said subscriber system from said video file server, said communication subsystem of said subscriber system transmitting such commands to said video file server.

11. The subscriber system of claim 1 further comprising:
 a video image memory for storing image data representing a visible image; and
 a video image multiplexer, responsive to commands from said control microprocessor, that receives video data from said programmable video data format conversion subsystem and selectively transmits portions of such video data to said video signal generation subsystem, said video image multiplexer also receiving image data from said video image memory and selectively transmitting portions of such image data to said video signal generation subsystem.

12. The subscriber system of claim 11 further comprising a video data generation subsystem, responsive to commands from said control microprocessor, for receiving a video signal obtained from a visible image, and for generating video data from said received video signal, said video data generation subsystem transmitting the video data thus generated to said video image memory for storage therein.

13. The subscriber system of claim 11 wherein the video image data stored in said video image memory is generated by a computer program executed by said control microprocessor.

14. The subscriber system of claim 13 further comprising a sound generator, responsive to commands from said control microprocessor, for generating audio data, said sound generator transmitting said audio data to said audio signal generation subsystem; said audio signal generation subsystem in response to the audio data received from said sound generator generating an audio signal adapted for producing an audible sound.

15. A method for producing a visible image and an audible sound from compressed data, comprising the steps of:

receiving compressed data;

separating the compressed data into compressed video data and compressed audio data;

converting the compressed video data into video data in a programmable video data format conversion subsystem that executes a video data conversion computer program selected by a control microprocessor from a plurality of video data conversion computer programs, each video data conversion computer program being capable of converting video data compressed in accordance with a particular pre-specified conversion standard into video data;

generating a video signal adapted for producing a visible image from the video data;

converting the compressed audio data into audio data in a programmable audio data format conversion subsystem that executes an audio data conversion computer program selected by the control microprocessor from a plurality of audio data conversion computer programs, each audio data conversion computer program being capable of converting audio data compressed in accordance with a particular pre-specified conversion standard into audio data; and generating an audio signal adapted for producing an audible sound from the audio data.

16. The method of claim 15 further comprising the steps of:

obtaining a video signal from a visible image;

generating video data from the video signal obtained from the visible image and supplying the video data thus generated to the programmable video data format conversion subsystem;

converting the video data generated from the video signal of the visible image into compressed video data in the programmable video data format conversion subsystem; and transmitting the compressed video data produced by the programmable video data format conversion subsystem.

17. The method of claim 16 wherein the programmable video data format conversion subsystem executes a video data conversion computer program selected by the control microprocessor from a plurality of video data conversion computer programs, each video data conversion computer program being capable of converting video data into compressed video data in accordance with a particular pre-specified conversion standard.

18. The method of claim 16 wherein the programmable video data format conversion subsystem converts received compressed video data into video data while concurrently converting video data generated from the video signal of the visible image into compressed video data.

19. The method of claim 18 further comprising the steps of:

obtaining an audio signal from an audible sound;

generating audio data from the audio signal obtained from the audible sound and supplying the audio data thus generated to the programmable audio data format conversion subsystem;

converting the audio data generated from the audio signal of the audible sound into compressed audio data in the programmable audio data format conversion subsystem; and transmitting the compressed audio data produced by the programmable audio data format conversion subsystem.

20. The method of claim 19 wherein the programmable audio data format conversion subsystem executes an audio data conversion computer program selected by the control microprocessor from a plurality of audio data conversion computer programs, each audio data conversion computer program being capable of converting audio data into compressed audio data in accordance with a particular pre-specified conversion standard.

21. The method of claim 19 wherein the programmable audio data format conversion subsystem converts received compressed audio data into audio data while concurrently converting audio data generated from the audio signal of the audible sound into compressed audio data.

22. The method of claim 15 wherein the compressed data is received from a communication channel that provides bandwidth on demand, the method further comprising the step of varying the capacity of the communication channel from instant to instant responsive to transitory communication requirements.

23. The method of claim 15 wherein the compressed data is received from a video file server, the method further comprising the step of transmitting commands entered at a keypad to the video file server for controlling the transmission of compressed data by the video file server.

24. The method of claim 15 wherein the compressed data is received from a video file server, the method further comprising the step of transmitting commands entered with a mouse to the video file server for controlling the transmission of compressed data by the video file server.

25. The method of claim 15 further comprising the steps of:

storing image data representing a visible image in a video image memory; and selectively generating the video signal adapted for producing a visible image either from the video data obtained by converting compressed video data into video data, or from the image data stored in the video image memory.

26. The method of claim 25 further comprising the steps of:

obtaining a video signal from a visible image;

generating video data from the video signal obtained from the visible image; and storing the video data into the video image memory.

27. The method of claim 25 further comprising the step of generating with the control microprocessor the image data stored in the video image memory.

28. The method of claim 27 further comprising the steps of:

generating audio data with a sound generator in response to commands received from the control microprocessor; and generating an audio signal adapted for producing an audible sound from the audio data generated by the sound generator.

* * * * *